United States Patent [19]

Stanton

[11] 4,336,653
[45] Jun. 29, 1982

[54] ENGLISH UNIT TO METRIC UNIT CONVERSION DEVICE

[76] Inventor: Robert P. Stanton, 1436 Millrace, Fairborn, Ohio 45324

[21] Appl. No.: 727,324

[22] Filed: Sep. 27, 1976

[51] Int. Cl.³ .............................................. G01B 3/02
[52] U.S. Cl. ...................................... 33/1 B; 33/476; 33/483
[58] Field of Search ................ 33/111, 150, 1 F, 1 B, 33/192, 107, 104, 476, 483

[56] References Cited

U.S. PATENT DOCUMENTS

| | | | |
|---|---|---|---|
| 1,155,059 | 9/1915 | Heathcote | 33/104 |
| 2,300,448 | 11/1942 | Ludwig | 33/150 X |
| 2,353,799 | 7/1944 | Ward | 33/192 X |
| 2,547,745 | 4/1951 | Cade et al. | 33/1 F |
| 2,589,525 | 3/1952 | Absher | 33/104 |
| 3,528,077 | 9/1970 | Seiden | 33/1 B |

FOREIGN PATENT DOCUMENTS 9227 of 1902 United Kingdom .................. 33/111

Primary Examiner—William D. Martin, Jr.
Attorney, Agent, or Firm—Donald J. Singer; Thomas L. Kundert

[57] ABSTRACT

A conversion chart having a transparent base sheet with a first series of divergent solid lines and a second series of divergent broken lines, with the first and second series of lines having a common base line. The first series of divergent lines are spaced along any perpendicular to the base line an integral number of units in an English system of units, such as feet or pounds mass and the broken lines are spaced along any perpendicular to a base line an integral number of corresponding units in a metric system of units, such as meters or Kilograms.

1 Claim, 5 Drawing Figures

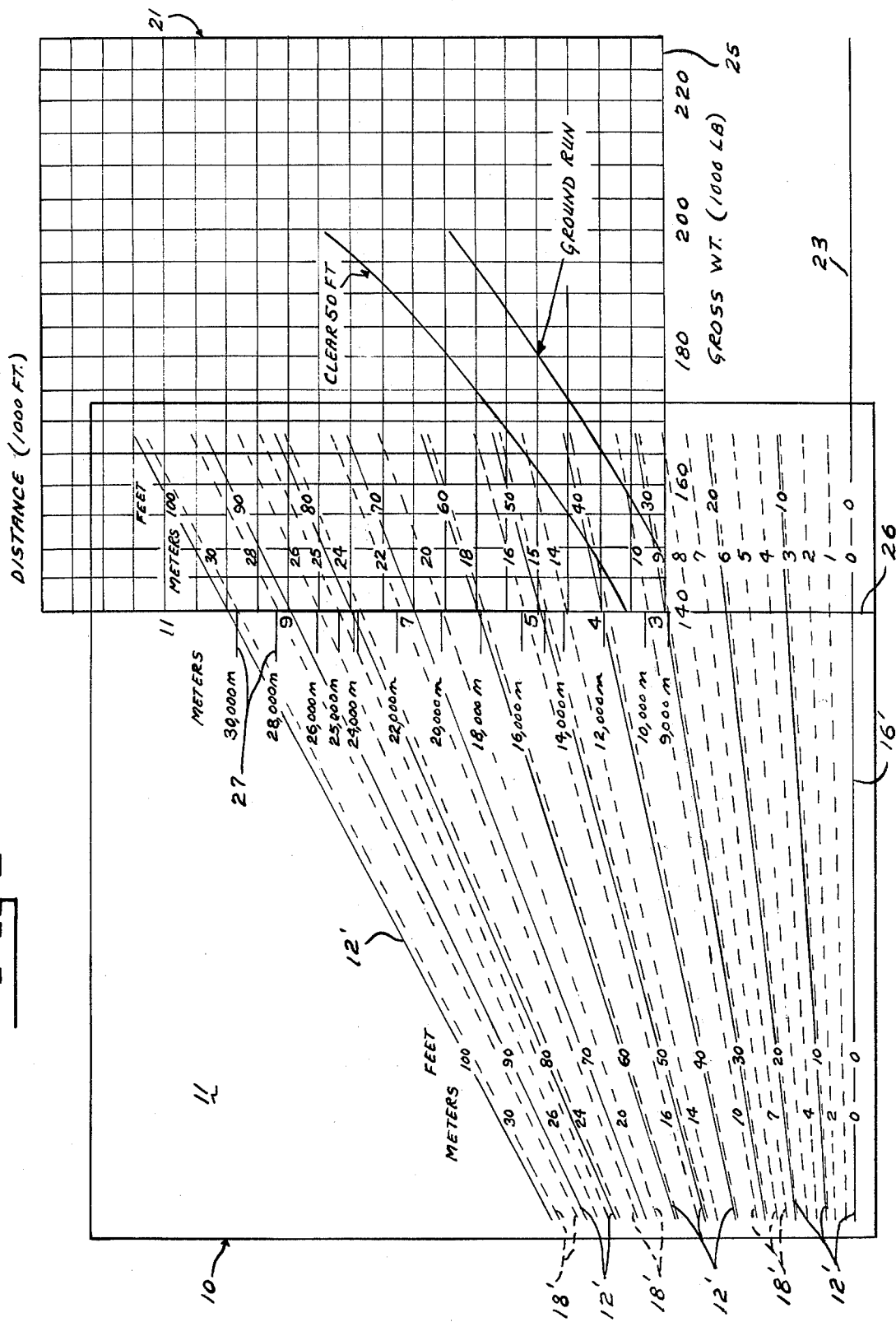

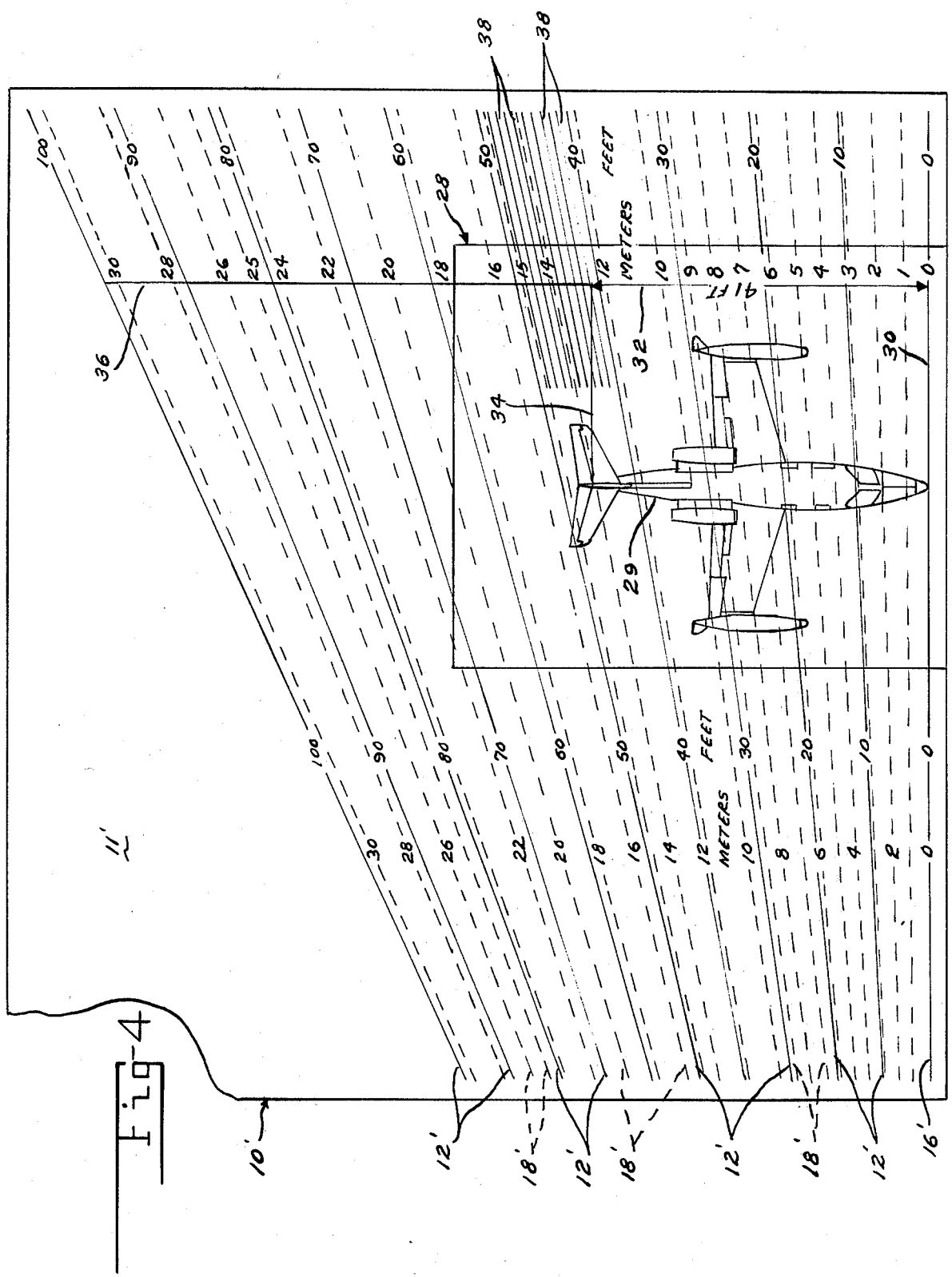

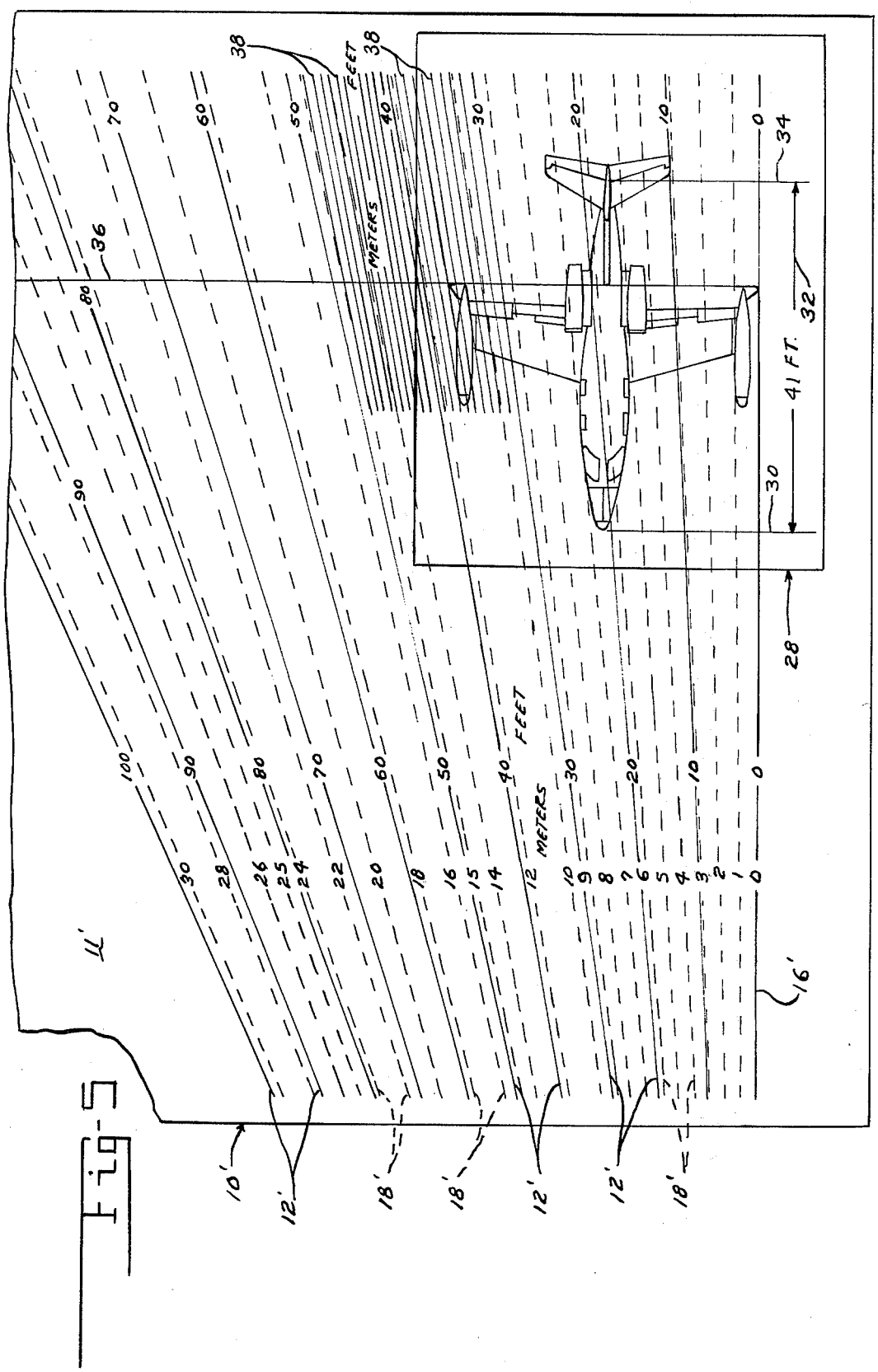

ENGLISH UNIT TO METRIC UNIT CONVERSION DEVICE

RIGHTS OF THE GOVERNMENT

The invention described herein may be manufactured and used by or for the Government of the United States for all governmental purposes without the payment of any royalty.

BACKGROUND OF THE INVENTION

This invention relates to a conversion chart for converting from one system of units to another system of units.

In the revision of handbooks and other publications, conversions, on a large scale, are required in converting charts, graphs and drawings from English units to metric units. Considerable time would be required to make these conversions if conventional conversion tables were used or if the conversions had to be made with an electronic calculator.

BRIEF SUMMARY OF THE INVENTION

According to this invention, a transparent chart is provided having thereon a first series of diverging straight lines with spacings, along any perpendicular to a base line, corresponding to English units and a second series of diverging straight lines with spacings, along any perpendicular to the same base line, corresponding to metric units.

IN THE DRAWINGS

FIG. 3 shows one use for the device of FIG. 1.

FIG. 4 shows the device of FIG. 1 as calibrated from a known dimension on a drawing.

FIG. 5 shows the device of FIG. 1 used for determining unknown dimensions on a drawing.

DETAILED DESCRIPTION OF THE INVENTION

Figure 1:
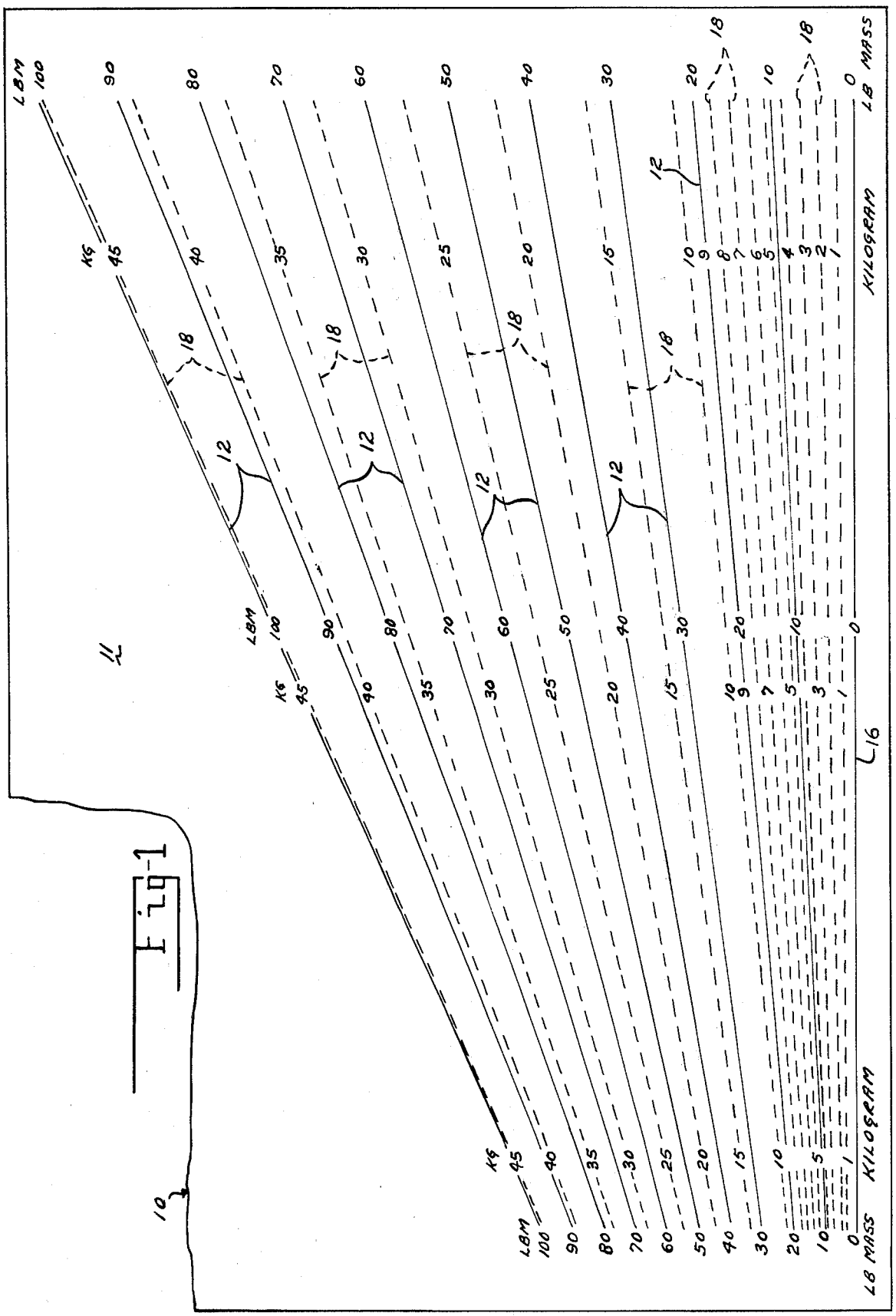
FIG. 1 is a plan view of the device of the invention.
Figure 2:
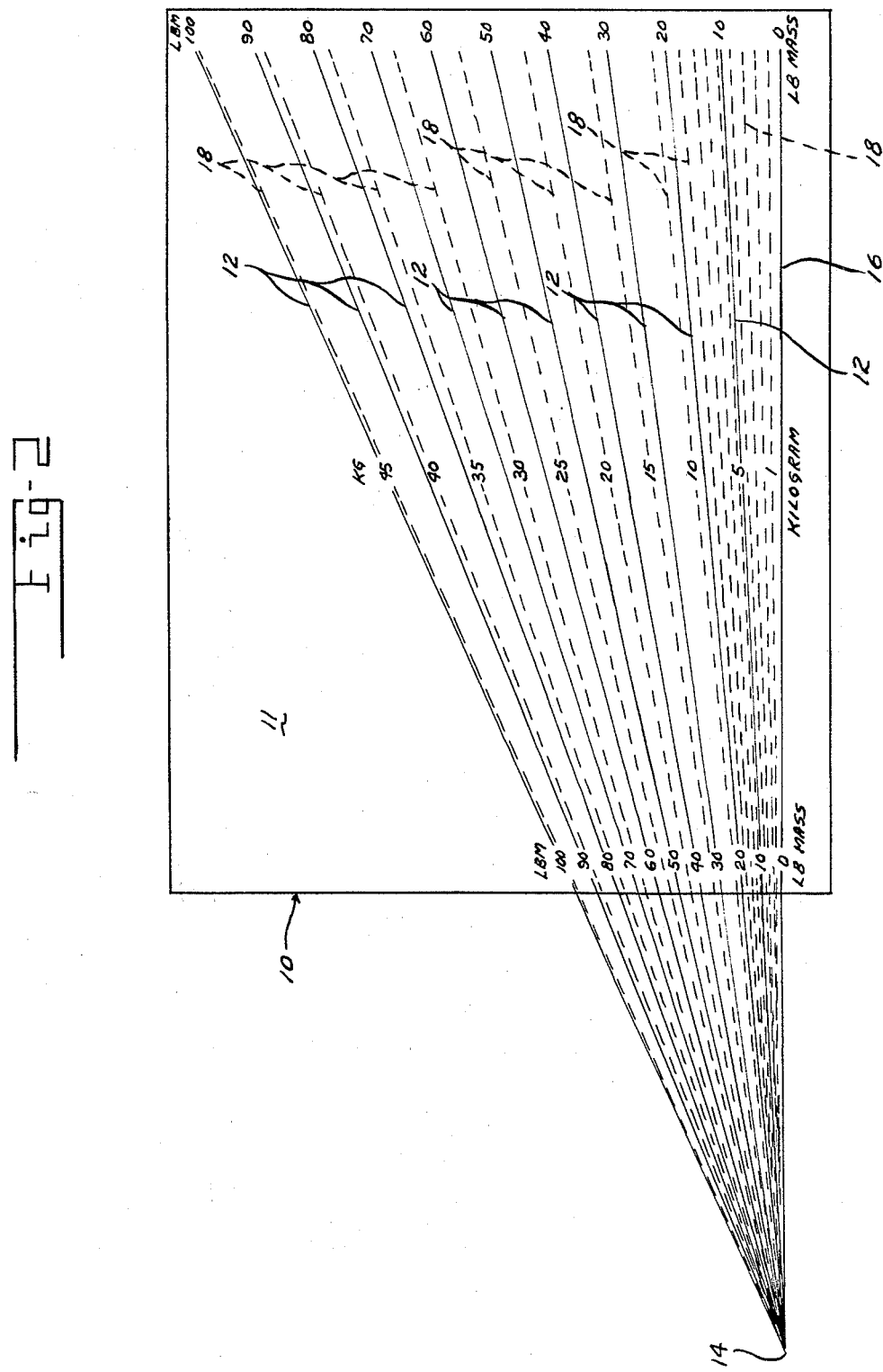
FIG. 2 shows the device of FIG. 1 with the lines extended to a common point.

Reference is now made to FIG. 1 of the drawing which shows a conversion device 10 and a transparent sheet of material 11, such as polystyrene. Other transparent or semitransparent materials could be used. A plurality of first straight lines 12 are marked off on the transparent sheet 11. The lines 12 diverge from a common point 14 off of the transparent sheet, as shown in FIG. 2. The lines 12 are spaced, along any perpendicular to a zero base line 16, distances proportional to integral number of units, in an English system of units, here shown as units of 10 lbs mass. A plurality of second straight lines 18, with a common zero base line 16 are marked off on the transparent sheet 11 on the same side of zero base line 16 as lines 12. The lines 18 also diverge from common point 14. The lines 18 are spaced along any line perpendicular to the zero base line 16 distances proportional to integral number of units in a metric system of units, here shown as Kilograms.

Lines 12 are shown as solid lines and lines 18 are shown as dashed lines; however, any markings may be used to make lines 18 visibly distinguishable from lines 12. Also, other units such as feet and meters or dollars and pounds could be used.

In the use of a device 10' of the invention, with markings in feet and meters, a zero line 23 is marked off, parallel to base line 25, on a figure, such as a graph 21 as shown in FIG. 3. With the zero line of conversion device 10' moving along line 23, device 10 is moved until units on the conversion device corresponds to units of equal or proportional value on the graph. Here the 30 foot line on device 10 is aligned with the 3000 foot line on graph 21 and the 40 and 50 feet lines are aligned with the 4000 and 5000 feet lines of graph 21. The device 10 can then be secured to the graph in this position and points on the graph can be read in meters. Also, a line 26 perpendicular to line 16' can be drawn on device 10' to make it easier to relocate the device on the graph. The device 10' can also be used to provide meter markings 27 on the graph 21 as shown. A similar conversion can be made along the other axis of the graph with the device 10, shown in FIGS. 1 and 2.

Another use for the device of the invention is shown in FIGS. 4 and 5. The drawing 28 in FIG. 4 shows an illustration, of unknown scale, of an aircraft 29. If one dimension of the drawing, such as the length of the fuselage 32, as shown, is known in either English units or metric units, other dimensions, in either English units or metric units, can be found with the device 10'.

The device 10' is placed over the drawing 28. The zero line of device 10' is made to lie along line 30 on the drawing. The device 10' is then moved over the drawing with line 30 moving along the zero line until the end of line 32 at line 34 corresponds to the 41 ft line on device 10'. Additional lines 38 can be drawn on device 10', where needed, to aid in determining intermediate dimensions. A line 36 is then drawn on device 10' along line 32 on drawing 28. Device 10' with line 36 can then be used to determine any dimension on the drawing 28. For example, the wing span, tip-to-tip distance, can be determined as shown in FIG. 5. With line 36 lying along the wings and with one tip of the wings at the zero line on scale 10', the tip-to-tip distance can be read, along line 36, in either English units or metric units. Additional lines 38 can be drawn on device 10' to aid in taking the reading. Like lines, not shown, could be provided on the metric scale.

There is thus provided a conversion device for converting from one system of units to another system of units.

I claim:

1. The method of determining dimensions in one system of measurements on a drawing having at least one known dimension in a second system of measurements, comprising: placing a transparent sheet having; a base line and a first series of diverging straight lines each spaced distances proportional to an integral number of units along any perpendicular in said one system of measurement from the base line and a second series of divergent straight lines, on the same side of the base line as the first series of straight lines, each spaced from the base line distances proportional to an integral number of units along any perpendicular in the second system of measurement; over the drawing; moving the transparent sheet over the drawing until the known dimension on the drawing coincides with the corresponding dimension along a certain perpendicular to the base line in the second system of measurement; drawing a line on said transparent sheet along said certain perpendicular; moving the line along said certain perpendicular to other portions of the drawing to determine the dimensions.

* * * * *